US012290843B2

(12) United States Patent
Leitner

(10) Patent No.: US 12,290,843 B2
(45) Date of Patent: May 6, 2025

(54) SORTING OUT WASTE GLASS CULLET WITH A HIGHER IRON OXIDE CONTENT

(71) Applicant: BINDER + CO AG, Gleisdorf (AT)

(72) Inventor: Karl Leitner, Anger (AT)

(73) Assignee: BINDER + CO AG, Gleisdorf (AT)

( * ) Notice: Subject to any disclaimer, the term of this patent is extended or adjusted under 35 U.S.C. 154(b) by 0 days.

(21) Appl. No.: 18/801,903

(22) Filed: Aug. 13, 2024

(65) Prior Publication Data

US 2025/0083192 A1 Mar. 13, 2025

(30) Foreign Application Priority Data

Sep. 7, 2023 (EP) ..................................... 23195961

(51) Int. Cl.
*B07C 5/34* (2006.01)
*B07C 5/342* (2006.01)

(52) U.S. Cl.
CPC .......... *B07C 5/3425* (2013.01); *B07C 5/3422* (2013.01); *B07C 2501/0054* (2013.01); *B07C 2501/0072* (2013.01)

(58) Field of Classification Search
CPC ..... B07C 5/3416; B07C 5/342; B07C 5/3422; B07C 5/3425; B07C 2501/0054; B07C 2501/0072
USPC .................................................. 209/581, 582
See application file for complete search history.

(56) References Cited

U.S. PATENT DOCUMENTS 5,190,163 A * 3/1993 Anzai ................... B07C 5/3416 209/582
5,502,559 A * 3/1996 Powell .................. B07C 5/3416 209/582
6,137,074 A * 10/2000 Doak .................... B07C 5/3425 209/587
6,504,124 B1 * 1/2003 Doak ...................... B07C 5/368 209/581
7,280,202 B2 * 10/2007 Okumura ............. H05K 3/3463 356/417
(Continued)

FOREIGN PATENT DOCUMENTS

EP 0 426 893 5/1991

OTHER PUBLICATIONS

Extended Europe Search Report (EESR) conducted in counterpart Europe Appln. No. 23195961.0 (Feb. 21, 2024) (w/ Translation).

*Primary Examiner* — Joseph C Rodriguez
(74) *Attorney, Agent, or Firm* — GREENBLUM & BERNSTEIN, P.L.C.

(57) ABSTRACT

Method and sorting system for sorting out waste glass cullet with a higher content of iron oxide from a single-layer material stream of waste glass cullet. The material stream contains waste glass cullet with a higher and a lower content of iron oxide. The material stream is irradiated with visible light and the visible transmission light passing through the waste glass cullet is detected, the material stream is irradiated with infrared light in a frequency range of at least 1100-1200 nm and the infrared transmission light passing through the waste glass cullet is detected, a waste glass cullet is classified as having a higher content of iron oxide if the ratio of the intensity of the infrared transmission light to the intensity of the visible transmission light exceeds or falls below a predetermined threshold value, and the cullet classified in this way is separated from other waste glass cullet.

18 Claims, 3 Drawing Sheets

(56) References Cited

U.S. PATENT DOCUMENTS

| | | | | |
|---|---|---|---|---|
| 8,803,020 | B2 * | 8/2014 | Huber | G01N 21/6456<br>209/524 |
| 2008/0128336 | A1 * | 6/2008 | Afsari | B07C 5/368<br>209/582 |

* cited by examiner

SORTING OUT WASTE GLASS CULLET WITH A HIGHER IRON OXIDE CONTENT

CROSS-REFERENCE TO RELATED APPLICATION

This applications claims priority under 35 U.S.C. § 119 (a) to Europe application Ser. No. 23/195,961.0 filed Sep. 7, 2023, the disclosure of which is expressly incorporated by reference herein in its entirety.

FIELD OF THE INVENTION

The present invention relates to a method for sorting out waste glass cullet with a higher content of iron oxide from a single-layer material stream of waste glass cullet, wherein the material stream contains waste glass cullet with a higher and with a lower content of iron oxide, as well as to a corresponding sorting system and a corresponding computer program product.

The waste glass fragments may contain shards of container glass, flat glass, window glass, flacons, façade glass and vehicle windows.

Single-layered means that the individual pieces of waste glass do not lie on top of each other but next to each other, i.e., they do not overlap over a large area. Ideally, the individual pieces of waste glass cullet should be spaced apart so that they can be easily recognized as individual objects by optical equipment.

The material stream can consist exclusively of waste glass cullet, but it is also conceivable that the material stream contains other objects in addition to waste glass cullet, such as objects made of plastic, ceramics, stones, etc. These could also be removed due to other criteria, such as very low transparency.

The present invention is mainly intended to recognize waste glass cullet with a higher content of iron oxide in the form of $Fe_2O_3$.

DISCUSSION OF BACKGROUND INFORMATION

Certain properties of waste glass cullet can be detected using visible light and optical sensors and used for sorting purposes. If waste glass cullet has a high $Fe_2O_3$ content, it appears greenish in color. Separating waste glass cullet with a high to medium iron oxide content from waste glass cullet with a low iron oxide content is desirable because waste glass cullet with a low iron oxide content can be processed into higher quality glass in a processing plant. However, the low iron oxide content makes it difficult to identify the iron oxide content due to the low coloration.

SUMMARY OF THE INVENTION

It is therefore an object of the present invention to provide a method and a corresponding sorting system in which waste glass cullet in a single-layer material stream can be classified according to its iron oxide content with as little effort as possible and separated at least into a fraction with a higher iron oxide content and a fraction with a lower iron oxide content.

This object is solved by a method according to claim 1 in such a way

- that the material stream is irradiated with visible light and the visible transmission light passing through the waste glass cullet is detected,

- that the material stream is irradiated with infrared light in a frequency range of at least 1100-1200 nm and the infrared transmission light passing through the waste glass cullet is detected,
- that a piece of waste glass cullet is classified as having a higher content of iron oxide if the ratio of the intensity of the infrared transmission light to the intensity of the visible transmission light exceeds or falls below a predetermined threshold value, and
- that waste glass cullet classified in this way is separated from other waste glass cullet.

Surprisingly, investigations by the inventors have shown that waste glass cullet exhibits attenuation of the spectra in the near infrared range from 1100 to 1200 nm depending on its iron oxide content. The greater the iron oxide content, the greater the attenuation. However, the attenuation can also be measured for waste glass cullet with a low iron oxide content. Although different wall thicknesses and possible and unavoidable contamination of the waste glass cullet lead to impairment of the transmission measurement in the infrared range, this impairment can be compensated for by the additional transmission measurement in the visible range, preferably in the 400 to 650 nm range. According to the investigations by the investors, a complex determination of the wall thicknesses of the waste glass cullet, e.g., by means of laser measurement, can be omitted if the intensities of the two spectral ranges, visible and infrared, are set in relation to each other. This ratio can be used as a measure of transparency with regard to iron oxide.

The visible transmission light passing through the waste glass cullet is also used to determine the shape and spatial location of the waste glass cullet so that it can then be separated according to its iron oxide content by units for deflecting of a device for sorting out other waste glass cullet.

One embodiment variant of the invention provides that an intensity of a red, a green and a blue spectral range is determined when detecting the visible transmission light passing through the waste glass fragments, and either the highest value or the mean value of the three intensities is used as the intensity of the visible transmission light.

This means that a conventional color camera can be used to detect visible light, for example, and no special cameras are required. In addition, the intensity of the red, green and blue channels of the color camera can simply be read out, wherein the highest value of the three values or the mean value of the three values is then used as the intensity of the visible transmission light to form the ratio of the intensity of the infrared transmission light to the intensity of the visible transmission light.

In order to be able to use the simplest possible light sources for visible light, it may be provided, that the visible light for irradiating the material stream is white light and the visible transmission light passing through the waste glass cullet is detected in a color camera. In this embodiment variant, therefore, light sources for white light are used, but a color camera is then required to detect the visible transmission light.

In order to be able to use a monochrome camera for visible light, it may be provided that the visible light for irradiating the material stream is alternately red, green and blue light and the visible transmission light passing through the waste glass cullet is detected in a monochrome camera, preferably in the same monochrome camera. This requires one or more light sources that emit red, green and blue light cyclically so that an image of the same area of the material stream in the red, green and blue frequency range can be taken with as little time delay as possible. From these images using the monochrome camera, the intensity of the transmission light in the red, green and blue frequency range in particular can then be determined for the individual pieces of waste glass, so that the highest or the averaged value of the three intensities in the ratio of the intensity of the infrared transmission light to the intensity of the visible transmission light is used as the intensity of the visible transmission light.

The red spectral range can, for example, include the wavelengths from 570-650 nm. The maximum intensity for the red spectral range is usually in the range of 600-630 nm.

The green spectral range can, for example, include the wavelengths from 470-570 nm. The maximum intensity for the green spectral range is usually in the range of 525-530 nm.

The blue spectral range can, for example, include the wavelengths from 400-470 nm. The maximum intensity for the blue spectral range is usually in the 430-450 nm range.

One embodiment variant of the invention provides that the intensity of the infrared transmission light is determined as the mean value of the intensity in the frequency range of 1100-1200 nm.

In a particularly simple way, the intensities are simply averaged over the entire meaningful frequency range of the infrared light and this mean value is used as the intensity of the infrared transmission light in the ratio of the intensity of the infrared transmission light to the intensity of the visible transmission light.

The use of intensity in the entire frequency range of 1100-1200 nm is preferred.

An alternative embodiment of the invention provides that the intensity of the infrared transmission light is the intensity in a sub-range of the frequency range of 1100-1200 nm. The sub-range may have a bandwidth of 10-20 nm, 20-30 nm, 30-40 nm, 40-50 nm, 50-60 nm, 60-70 nm, 70-80 nm, 80-90 nm or 90 to less than 100 nm. The sub-range can be located at the lower end of the frequency range of 1100-1200 nm, at the upper end of the frequency range of 1100-1200 nm or in between.

In this case, only the mean value of the intensity of a narrow-band frequency range in the meaningful frequency range of the infrared light is used, and this mean value is used as the intensity of the infrared transmission light in the ratio of the intensity of the infrared transmission light to the intensity of the visible transmission light. This has the advantage that higher sampling rates (clock rates) can be achieved with spectrally resolving infrared cameras.

As an alternative to infrared cameras with spectral resolution technology, infrared cameras with NIR-sensitive sensors can of course also be used. Filters can be used to limit the spectral range.

In order to be able to sort out several classes of waste glass cullet containing different amounts of iron oxide at the same time, it may be provided that a further subdivision of waste glass cullet classified as having a higher content of iron oxide is carried out on the basis of the ratio of the intensity of the infrared transmission light to the intensity of the visible transmission light.

In particular, for this purpose it may be provided, that at least one further threshold value is specified for the further subdivision, which threshold value the ratio of the intensity of the infrared transmission light to the intensity of the visible transmission light exceeds or falls below.

It is understood that a further subdivision according to the iron oxide content can also be made in a similar way for waste glass cullet classified as having a lower iron oxide content, for example by specifying a threshold value that determines the separation of waste glass cullet with a low and cullet with a very low iron oxide content.

In order to achieve a high throughput during sorting, it may be provided that the visible transmission light passing through the waste glass cullet and/or the infrared transmission light passing through the waste glass cullet is detected in the form of an image of several pieces of waste glass cullet.

In this way, several pieces of waste glass cullet can be detected simultaneously in the single-layer material stream of waste glass cullet. As a rule, the material stream has a defined width and an image covers this width, which means that several pieces of waste glass cullet are usually detected simultaneously by one image.

In this embodiment of the invention, at least one image in the visible range and one image in the infrared range are created of the same waste glass cullet (i.e., of the same area of the single-layer material stream). The at least one image in the visible range also defines the individual pieces of waste glass cullet and their position.

As a rule, the image in the visible range and the image in the infrared range are taken simultaneously because the two images can then be compared directly with each other. However, a slight time delay between the recording of the first image and that of the second image would also be possible and could be taken into account or compensated for during image processing.

The image in the visible range and the image in the infrared range are linked together—usually with image processing software—as they have been created by different detectors, and processed, the waste glass fragments are classified and sorted out according to the sorting criteria in the correct time and location.

In the method according to the invention, it may be provided in one of several possible embodiment variants that the predetermined threshold value for the ratio of the intensity of the infrared transmission light normalized to 1 to the intensity of the visible transmission light normalized to 1, which threshold value determines the classification for a higher or for a lower content of iron oxide, is greater than or equal to 0.9, preferably greater than or equal to 0.92, and a piece of waste glass cullet is classified as having a higher content of iron oxide if the ratio of the intensity of the infrared transmission light normalized to 1 to the intensity of the visible transmission light normalized to 1 is below the predetermined threshold value. The measured intensities of the transmission light are normalized to the value 1, i.e., they lie in the range from zero to 1. Since the measured intensities of the infrared transmission light are generally smaller than the measured intensities of the visible transmission light, the ratio of the intensity of the infrared transmission light normalized to 1 to the intensity of the visible transmission light normalized to 1 will generally be less than 1.

It is of course also conceivable that the threshold value is less than 0.9.

A further subdivision of the waste glass cullet with a higher content of iron oxide would be possible in the said particular embodiment, for example, if a further threshold value below the predetermined threshold value of 0.9 and greater, preferably below 0.92 and greater, is specified, for example in the range from 0.7 to 0.8. Waste glass cullet with a ratio of the intensity of the infrared transmission light normalized to 1 to the intensity of the visible transmission light normalized to 1 of more than 0.9 and greater, preferably more than 0.92 and greater, is classified in this example as having a low iron oxide content. Waste glass cullet with a ratio of the intensity of the infrared transmission light normalized to 1 to the intensity of the visible transmission light normalized to 1 of equal to or less than 0.9 and greater, preferably equal to or less than 0.92 and greater (i.e. equal to or less than the specified threshold value), but equal to or greater than 0.7 to 0.8 (i.e. equal to or greater than the further threshold value) is classified as having a high iron oxide content. Waste glass cullet with a ratio of the intensity of the infrared transmission light normalized to 1 to the intensity of the visible transmission light normalized to 1 of less than 0.7 to 0.8 (i.e., less than the further threshold value) is classified as having a very high iron oxide content.

Whether the waste glass cullet with a higher iron oxide content is sorted out from the waste glass cullet with a lower iron oxide content or vice versa is not important. One or more fractions can be sorted out by blow-out nozzles using compressed air, for example.

The sorting system for carrying out the method according to the invention is characterized in that it comprises at least

- a first light source for visible light, with which a single-layer material stream of waste glass cullet can be illuminated,
- a first detector for visible light, with which the visible transmission light passing through the waste glass cullet can be detected, in particular in the form of an image of several pieces of waste glass cullet,
- a second light source, which can emit infrared light in a frequency range of at least 1100-1200 nm,
- a second detector for infrared light, with which the infrared transmission light passing through the waste glass cullet can be detected, in particular in the form of an image of several pieces of waste glass cullet,
- a device for producing a single-layer material stream from waste glass cullet, with which the material stream can be guided past the two light sources, and
- a device for sorting out, which then classifies a piece of waste glass cullet as having a higher content of iron oxide and separates it from other waste glass cullet in the material stream if the ratio of the intensity of the infrared transmission light to the intensity of the visible transmission light exceeds or falls below a predetermined threshold value.

The first and/or the second light source can each be composed of several individual light sources, in particular in order to be able to cover the entire width of the material stream of waste glass cullet. Likewise, the first and/or the second detector can each be composed of several individual detectors, in particular in order to be able to cover the entire width of the material stream of waste glass cullet.

The device for producing a single-layer material stream can, for example, comprise a conveyor belt or a conveyor trough which ends in front of the detection area and from which the waste glass cullet either falls freely through the detection area or reaches a translucent plate, e.g. a glass pane, which is aligned at an angle in the operating state of the sorting system and on which it slides through the detection area.

The sorting device comprises an evaluation and control unit and one or more units for deflecting waste glass cullet, e.g., blow-out nozzles. The evaluation and control unit determines the shape and spatial position of the individual pieces of waste glass cullet and classifies them as those with a higher and those with a lower iron oxide content based on the data from the detectors. Based on the evaluation, the evaluation and control unit controls the unit(s) for deflecting waste glass cullet in such a way that at least one fraction of waste glass cullet with a higher iron oxide content and one fraction with a lower iron oxide content are produced.

In one embodiment of the sorting system, it is provided that the first light source for visible light is designed to emit visible white light and the first detector is a color camera. The first light source is thus very simply designed. With this embodiment of the sorting system, the method variant can be implemented, according to which the visible light for irradiating the material stream is white light and the visible transmission light passing through the waste glass cullet is detected in a color camera.

In an alternative embodiment of the sorting system, the first light source for visible light is designed to alternately emit red, green and blue light and the first detector is a monochrome camera. In this case, the first light source is more complex, but the camera is simpler. With this embodiment of the sorting system, the method variant can be implemented according to which the visible light for irradiating the material stream is alternately red, green and blue light and the visible transmission light passing through the waste glass cullet is detected in a monochrome camera, preferably in the same monochrome camera.

In both cases, the sorting device can be designed in such a way that an intensity of a red, a green and a blue spectral range is determined when the visible transmission light passing through the waste glass cullet is detected, and the highest or the averaged value of the three intensities is used as the intensity of the visible transmission light.

The device for sorting out can be designed in such a way that the intensity of the infrared transmission light is determined as the mean value of the intensity in the frequency range of 1100-1200 nm or that the intensity of the infrared transmission light is the intensity in a sub-range of the frequency range of 1100-1200 nm.

The sorting device can also be designed in such a way that, based on the ratio of the intensity of the infrared transmission light to the intensity of the visible transmission light, a further subdivision of waste glass cullet classified as having a higher iron oxide content is carried out. In particular, the device for sorting out can be designed in such a way that at least one further threshold value is specified for the further subdivision, which the ratio of the intensity of the infrared transmission light to the intensity of the visible transmission light exceeds or falls below.

The sorting device can also be designed in such a way that the visible transmission light passing through the waste glass cullet and/or the infrared transmission light passing through the waste glass cullet is detected in the form of an image of several pieces of waste glass cullet. These two-dimensional images of waste glass cullet are generated by the evaluation and control unit, for example from image lines that run transverse to the direction of movement of the waste glass cullet. Each of the two detectors, the first detector for visible light and the second detector for infrared light, captures image lines that run transverse to the direction of movement of the waste glass cullet. These image lines are recorded at a high clock rate, usually between 0.3 and 20 kHz, and combined by image processing software in the evaluation and control unit to form a two-dimensional image of the material stream in the form of a single image or a continuous film. It is understood that it makes sense to synchronize the image lines of the two detectors in order to be able to combine and process the image data at the correct location and time. The movement speed of the waste glass cullet is typically between 1 and 3 m/s. Image lines are continuously recorded by the detectors at a clock rate of between 0.3 and 20 kHz and saved as blocks or saved as an image section. The evaluation and control unit combines the image lines of the detectors to form images and carries out the evaluation according to the invention, i.e., the classification into waste glass cullet with a higher and lower iron oxide content.

Since the method according to the invention is carried out on an industrial scale, e.g. is carried out with computer support, in particular using image-processing programs to define the location, shape and position of the individual pieces of waste glass cullet, the present invention also comprises a computer program product which comprises a program and can be loaded directly into a memory of a central computing unit of a sorting system, which sorting system comprises at least

- a first light source for visible light, with which a single-layer material stream of waste glass cullet can be illuminated,
- a first detector for visible light, with which the visible transmission light passing through the waste glass cullet can be detected, in particular in the form of an image of several pieces of waste glass cullet,
- a second light source which can emit infrared light in a frequency range of at least 1100-1200 nm,
- a second detector for infrared light, with which the infrared transmission light passing through the waste glass cullet can be detected, in particular in the form of an image of several pieces of waste glass cullet,
- a device for producing a single-layer material stream from waste glass cullet, with which the material stream can be guided past the two light sources, and
- a device for sorting out, which then classifies a piece of waste glass cullet as having a higher content of iron oxide and separates it from other waste glass cullet of the material stream if the ratio of the intensity of the infrared transmission light to the intensity of the visible transmission light exceeds or falls below a predetermined threshold value,
- having program means for carrying out all steps of the method according to the invention when the program is executed by the central computing unit.

The program can, for example, be stored on a data carrier, a storage medium or another computer-readable medium or made available as a signal via a data connection.

In particular, the program will cause

- that the material stream is irradiated with visible light (wherein the irradiation can also be continuous and/or is not regulated by the program) and the visible transmission light passing through the waste glass cullet is detected,
- that the material stream is irradiated with infrared light in a frequency range of at least 1100-1200 nm (wherein the irradiation can also be continuous and/or is not regulated by the program) and the infrared transmission light passing through the waste glass cullet is detected,
- that a piece of waste glass cullet is classified as having a higher content of iron oxide if the ratio of the intensity of the infrared transmission light to the intensity of the visible transmission light exceeds or falls below a predetermined threshold value, and
- that waste glass cullet classified in this way is separated from other waste glass cullet.

Furthermore, the program could also perform the method steps of claims 2-10.

BRIEF DESCRIPTION OF THE FIGURES

The invention will now be explained in more detail with the aid of schematic figures, which show exemplary embodiments of a sorting system according to the invention. The backlight method is used for the visible light and the infrared light, i.e., the light source and detector are arranged on opposite sides of the material stream.

DETAILED DESCRIPTION

Figure 1:
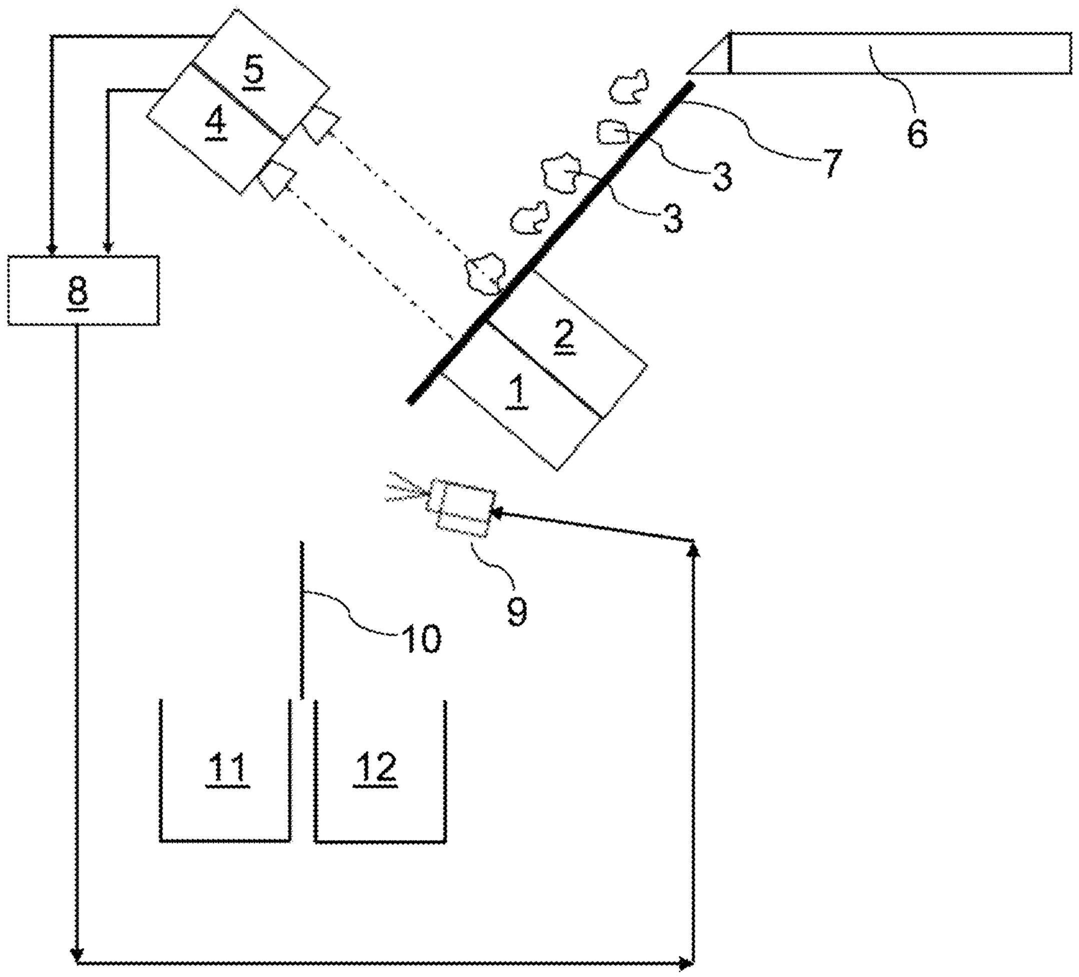
FIG. 1 shows a sorting system according to the invention.

In FIG. 1, a first light source 1 for visible light and a second light source 2, which can emit infrared light in a frequency range of at least 1100-1200 nm, are arranged in such a way that waste glass cullet 3 can be irradiated through an inclined glass pane 7. The visible transmission light from the first light source 1 that passes through the waste glass cullet 3 is detected in a first visible light detector 4. The infrared transmission light from the second light source 2 passing through the waste glass cullet 3 is detected in a second detector 5 for infrared light. The waste glass cullet 3 is fed onto a conveyor belt or conveyor trough 6 and conveyed by it onto the inclined glass pane 7, where it slides downwards by gravity. After the lower end of the glass pane 7, at least one blow-out nozzle 9 is arranged, which either blows the waste glass cullet 3 falling from the glass pane 7 on the basis of the control signals (see arrows) from the evaluation and control unit 8, so that it falls to the left of a partition wall 10 downwards into a first container 11 for the first fraction, e.g. for waste glass cullet 3 with a higher iron oxide content, or which waste glass cullet 3 falling from the glass pane 7 is not blown on the basis of the control signals (see arrows) of the evaluation and control unit 8, so that it falls undisturbed to the right of a partition wall 10 downwards into a second container 12 for the second fraction, e.g. for waste glass cullet 3 with a lower iron oxide content.

It is understood that it would also be possible for the blow-out nozzles 9 to be arranged (exclusively or also) on the opposite side of the material stream and, optionally, to blow on waste glass cullet 3 so that it falls downwards to the right of the partition wall 10 into the second container 12, while other waste glass cullet 3 is not blown on and falls into the first container 11.

The way in which the waste glass cullet 3 with different iron oxide contents is mechanically separated from one another is not essential to the invention.

The first light source 1 here emits white light in the range from at least 400 to 650 nm. The first light source 1 can be formed by one or—in particular in order to cover the entire width of the material stream of waste glass cullet 3—a plurality of LED lights.

The second light source 2 emits light in the infrared range, covering at least the wavelength range of 1100-1200 nm. Light sources can be used that cover a broad infrared spectrum, e.g., the range of 600-1300 nm, for example by means of one or—in particular to cover the entire width of the material stream of waste glass cullet 3—several infrared halogen emitters. However, light sources can also be used that are tuned to the required range, e.g., covering the range from 1100 to 1300 nm, for example by means of infrared LED lights.

The glass pane 7 serves as a chute for the waste glass cullet 3 to be examined. When the sorting system according to the invention is installed, it has an inclination of approximately 60°. The waste glass cullet 3 slides down it and is illuminated by the two light sources 1, 2. It is essential that the material for the glass pane 7 serving as a chute is translucent at least in the range of 400-1200 nm.

The spatial distance between the visible transmission light to be detected and the infrared transmission light to be detected should be as small as possible so that both detectors 4, 5, the one for visible light and the one for infrared light, can generate an image of the waste glass cullet 3 that matches as closely as possible.

The first detector 4 for detecting the visible transmission light is sensitive in a wavelength range of 400-650 nm; if necessary, the sensitivity can be narrowed to this wavelength range using filters. The first detector 4 is usually designed as a color camera. For example, it can be designed as a so-called RGB camera. The measurement results of the color camera can be divided into the color ranges red, green and blue by means of internal filtering. This means that the colors red, green and blue are each transmitted or stored in a separate channel.

The first detector 4 must at least be able to provide data for an image of the waste glass cullet 3 in shades of gray in order to detect the position and shape of the individual pieces of waste glass cullet 3. This can then be used to determine the position and shape of the individual pieces of waste glass cullet 3, which are necessary to remove them from the material stream by means of downstream units for deflecting cullet, in this case blow-out nozzles 9.

The first detector 4 could also be designed as a monochrome camera if the first light source 1 does not emit white light, but alternately red, green and blue light. The intensity of the transmitted light in the red, green and blue frequency range can then be determined in succession, in each case using a monochrome image.

The second detector 5 is usually an infrared camera and is sensitive at least in the 1100-1200 nm range.

The data detected by the two detectors 4, 5 are fed to the evaluation and control unit 8, which evaluates the two images and assigns the individual pieces of waste glass cullet 3 to the various fractions and controls the blow-out nozzles 9, which transfer the waste glass cullet 3 to the corresponding containers 11, 12.

Both the exposure time for the first detector 4 for visible light and for the second detector 5 for infrared light is in the order of 2 microseconds to 10,000 microseconds, for example. This enables a high image line rate or a high-resolution image to be achieved.

The obliquely aligned glass pane 7 could also be shortened. In this case, the area where the light from the two light sources 1, 2 hits the waste glass cullet 3 could be provided in the direction of movement of the waste glass cullet 3 (from top to bottom in FIG. 1) after the glass pane 7, i.e., below the lower edge of the glass pane 7. This would have the advantage that no translucent material is required for the chute and that any contamination of the chute does not affect the measurement result. The disadvantage of the shortened chute is that the waste glass cullet 3 is guided shorter, which can have a negative effect on the discharge efficiency, especially with small cullet 3.

FIG. 1 shows the connection of the detectors 4, 5 to the evaluation and control unit 8, generally a computing unit (e.g., computer), which can, for example, form the central computing unit of a sorting system, and which executes the program according to the invention. This evaluation and control unit 8 assembles the image lines of the detectors 4, 5 into images and carries out the evaluation according to the invention.

Depending on this evaluation, the units for deflecting are controlled, such as one or more blow-out nozzles 9 in this case. These are arranged below the glass pane 7 (or below a chute made of non-transparent material) and below the area where the waste glass cullet 3 is irradiated.

It would also be conceivable to separate the waste glass cullet 3 into three fractions, wherein the waste glass cullet 3 with a higher content of iron oxide is further subdivided, e.g., into a fraction with a medium content of iron oxide and a fraction with a high content of iron oxide.

Figure 2:
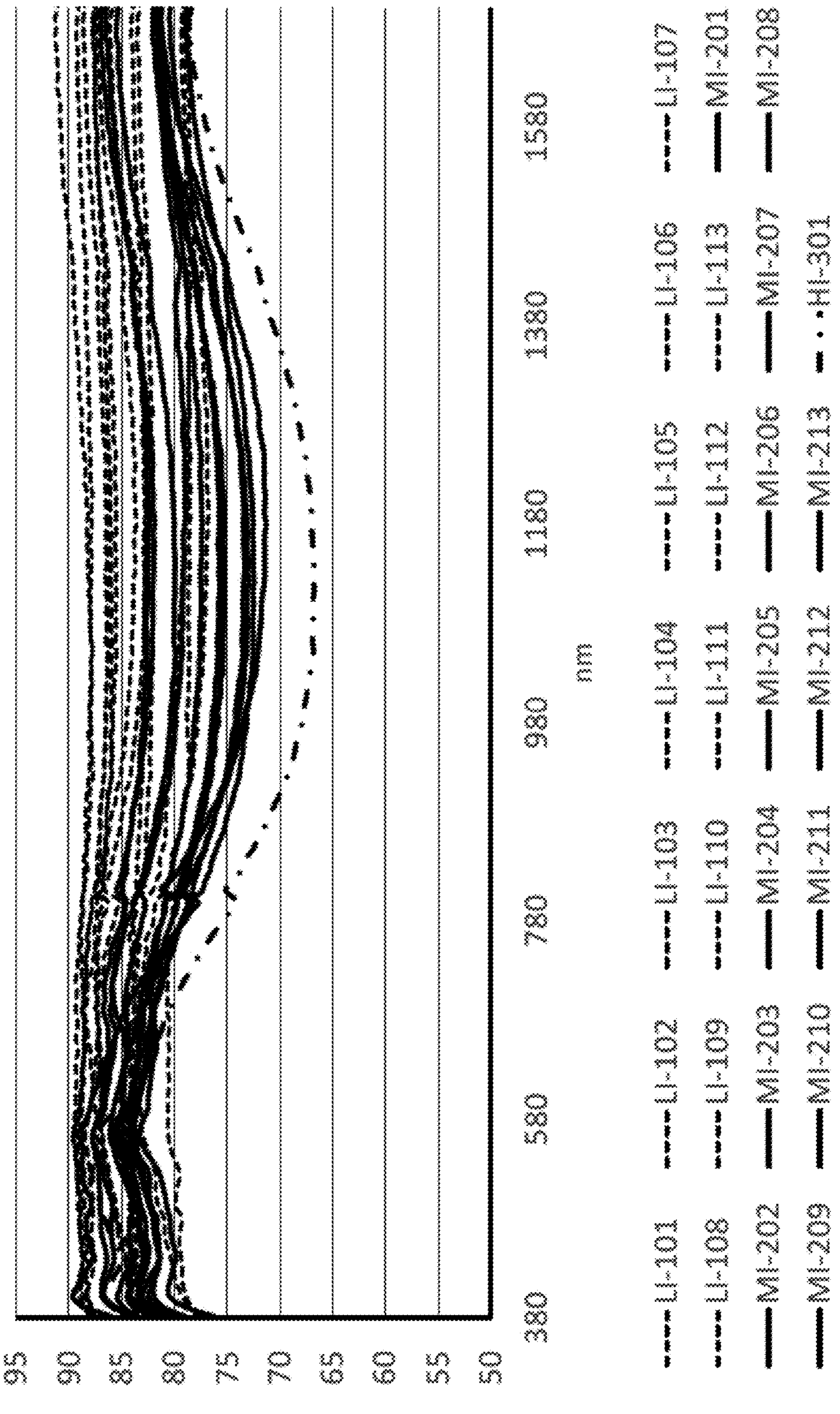
FIG. 2 shows spectra of the transmission light of various pieces of waste glass cullet with different iron oxide contents.

In FIG. 2, the intensity of the transmission light in the wavelength range of approx. 380-1680 nm is standardized for various pieces of waste glass cullet 3, here in the range of 0-100%. The intensities were determined in test measurements. Thirteen different types of waste glass with a low iron oxide content were measured, see dashed spectra LI-101 to LI-113, thirteen different types of waste glass with a medium iron oxide content, see solid spectra MI-201 to MI-213, and one type of waste glass with a high iron oxide content, see dotted spectrum HI-301.

It can be seen that the intensity in the visible wavelength range is generally slightly higher than in the infrared range around 1100-1200 nm for most waste glass cullet 3 of the waste glass types with a low iron oxide content, but the difference is not very large, only a few percentage points. The difference between the intensity in the visible wavelength range and in the infrared range around 1100-1200 nm is already greater for waste glass cullet 3 of the waste glass types with a medium iron oxide content. However, the difference between the intensity in the visible wavelength range and in the infrared range around 1100-1200 nm is greatest for the waste glass type with a high iron oxide content. Here, the maximum intensity in the green spectral range around 530 nm is approx. 88% (or 0.88 when normalized to 1), while in the infrared range around 1100-1200 nm it is approx. 67% (or 0.67 when normalized to 1).

Figure 3:
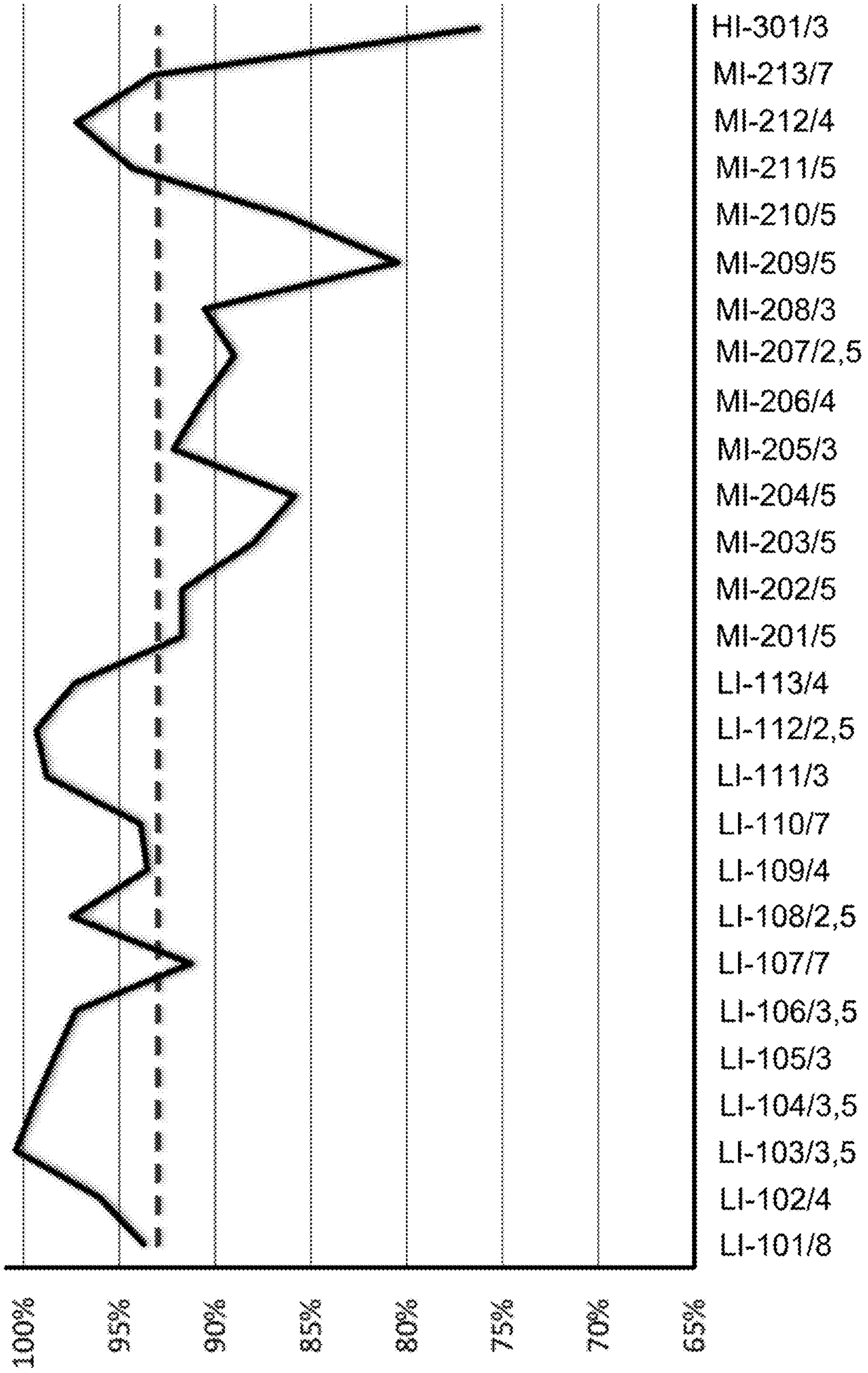
FIG. 3 shows a diagram of the ratio of the intensity of the infrared transmission light to the intensity of the visible transmission light according to the spectra of the waste glass cullet from FIG. 2.

In FIG. 3, the ratio of the intensity of the infrared transmission light in the 1100-1200 nm range to the maximum intensity, which occurs either in the red, green or blue spectral range, is shown as a percentage for the individual spectra from FIG. 2. This ratio serves as a measure of the transparency due to the iron oxide content and is used as a characteristic for classifying the iron oxide content.

The ratios for waste glass types with a low iron oxide content are shown on the left, the ratios for waste glass types with a medium iron oxide content are shown in the middle and the ratio for waste glass types with a high iron oxide content is shown on the far right. The iron oxide content increases from left to right in groups (LI, MI, HI). The individual ratios are connected by the solid line and tend to decrease from left to right. If a threshold value of e.g., 93% (or 0.93 when normalized to 1) is now defined—knowing the iron oxide content and the intensities measured in the test measurements, see dashed horizontal line—the ratios on the left-hand side of FIG. 3 are largely above this threshold value, while the ratios on the right-hand side of FIG. 3 are largely below this threshold value.

According to this example, in the industrial application of the method according to the invention to any waste glass cullet, those pieces of waste glass cullet where the ratio is above 93% (or above 0.93 when normalized to 1) are classified as pieces of waste glass cullet with a lower content of iron oxide and those pieces of waste glass cullet where the ratio is below 93% (or below 0.93 when normalized to 1) are classified as pieces of waste glass cullet with a higher content of iron oxide.

Since the iron oxide content and the corresponding intensities were determined during the test measurements, a further threshold value could also be defined for industrial applications, e.g., at 80% (or at 0.8 when normalized to 1). Waste glass cullet with a ratio of the intensity of the infrared transmission light to the intensity of the visible transmission light of more than 93% (or 0.93) is classified in this example as having a low iron oxide content. Waste glass cullet with a ratio of the intensity of the infrared transmission light to the intensity of the visible transmission light of less than 93% (or 0.93) but more than 80% (or 0.8) is classified as having a medium iron oxide content. Waste glass cullet with a ratio of the intensity of the infrared transmission light to the intensity of the visible transmission light of less than 80% (or less than 0.8) is classified as having a high iron oxide content.

LIST OF REFERENCE SIGNS

1 First light source for visible light
2 Second light source (for infrared light)
3 Piece of waste glass cullet
4 First detector for visible light
5 Second detector for infrared light
6 Conveyor trough
7 Glass pane (chute)
8 Evaluation and control unit (device for sorting out)
9 Blow-out nozzle (device for sorting out)
10 Partition wall (device for sorting out)
11 First container for first fraction (device for sorting out)
12 Second container for second fraction (sorting device)

The invention claimed is:

1. A method for sorting out waste glass cullet with a higher content of iron oxide from a single-layer material stream of waste glass cullet, wherein the material stream contains waste glass cullet with a higher and with a lower content of iron oxide, comprising:

irradiating the material stream with visible light and detecting the visible transmission light passing through the waste glass cullet, irradiating the material stream with infrared light in a frequency range of at least 1100-1200 nm and detecting the infrared transmission light passing through the waste glass cullet, wherein a piece of waste glass cullet is classified as having a higher iron oxide content when the ratio of an intensity of the infrared transmission light to an intensity of the visible transmission light exceeds or falls below a predetermined threshold value, and wherein the piece of waste glass cullet classified in this way is separated from other waste glass cullet.

2. The method according to claim 1, wherein an intensity of a red, a green and a blue spectral range is determined when detecting the visible transmission light passing through the waste glass cullet, and either the highest value or a mean value of the three intensities is used as the intensity of the visible transmission light.

3. The method according to claim 1, wherein the intensity of the infrared transmission light is determined as the mean value of an intensity in the frequency range of 1100-1200 nm.

4. The method according to claim 1, wherein the intensity of the infrared transmission light is the intensity in a sub-range of the frequency range of 1100-1200 nm.

5. The method according to claim 1, wherein a further subdivision of waste glass cullet classified as having a higher content of iron oxide is carried out on the basis of the ratio of the intensity of the infrared transmission light to the intensity of the visible transmission light.

6. The method according to claim 5, wherein at least one further threshold value is specified for the further subdivision, which threshold value the ratio of the intensity of the infrared transmission light to the intensity of the visible transmission light exceeds or falls below.

7. The method according to claim 1, wherein the visible light for irradiating the material stream is white light and the visible transmission light passing through the waste glass cullet is detected in a color camera.

8. The method according to claim 1, wherein the visible light for irradiating the material stream is alternately red, green and blue light and the visible transmission light passing through the waste glass cullet is detected in a monochrome camera.

9. The method according to claim 1, wherein the visible transmission light passing through the waste glass cullet and/or the infrared transmission light passing through the waste glass cullet is detected in the form of an image of several pieces of waste glass cullet.

10. The method according to claim 1, wherein the predetermined threshold value for the ratio of the intensity of the infrared transmission light normalized to 1 to the intensity of the visible transmission light normalized to 1 is greater than or equal to 0.9, and a piece of waste glass cullet is classified as having a higher content of iron oxide if when the ratio of the intensity of the infrared transmission light normalized to 1 to the intensity of the visible transmission light normalized to 1 is below the predetermined threshold value.

11. A sorting system for carrying out a method according to claim 1, comprising:

a first light source for visible light, with which a single-layer material stream of waste glass cullet is to be illuminated, a first detector for visible light, with which the visible transmission light passing through the waste glass cullet is detectable, a second light source, from which infrared light in a frequency range of at least 1100-1200 nm is to be emitted, a second detector for infrared light, with which the infrared transmission light passing through the waste glass cullet is detectable, a device for producing a single-layer material stream from waste glass cullet, with which the material stream is guidable past the two light sources, and a device for sorting out, which then classifies a piece of waste glass cullet as having a higher content of iron oxide and separates the piece of waste glass cullet from other waste glass cullet of the material stream when the ratio of the intensity of the infrared transmission light to the intensity of the visible transmission light exceeds or falls below a predetermined threshold value.

12. The sorting system according to claim 11, wherein the first light source for visible light is designed to emit white light and the first detector is a color camera.

13. The sorting system according to claim 11, wherein the first light source for visible light is designed alternately to emit red, green and blue light and the first detector is a monochrome camera.

14. A computer program product comprising:

a program loadable directly into a memory of a central computing unit of a sorting system, where the sorting system includes at least a first light source for visible light, with which a single-layer material stream of waste glass cullet is to be illuminated, a first detector for visible light, with which the visible transmission light passing through the waste glass cullet is detectable, a second light source from which infrared light in a frequency range of at least 1100-1200 nm is to be emitted, a second detector for infrared light, with which the infrared transmission light passing through the waste glass cullet can is detectable, a device for producing a single-layer material stream from waste glass cullet, with which the material stream is guidable past the two light sources, and a device for sorting out, which then classifies a piece of waste glass cullet as having a higher content of iron oxide and separates the piece of waste glass cullet from other waste glass cullet of the material stream if the ratio of the intensity of the infrared transmission light to the intensity of the visible transmission light exceeds or falls below a predetermined threshold value, wherein, when executed by the central computing unit, the program carrying out the method according to claim 1.

15. The method according to claim 8, wherein the visible light for irradiating the material stream is alternately red, green and blue light and the visible transmission light passing through the waste glass cullet is detected in a same monochrome camera.

16. The method according to claim 10, wherein the predetermined threshold value for the ratio of the intensity of the infrared transmission light normalized to 1 to the intensity of the visible transmission light normalized to 1 is greater than or equal to 0.92.

17. The sorting system according to claim 11, wherein the visible transmission light passing through the waste glass cullet is detectable in a form of an image of several pieces of waste glass cullet, and wherein the infrared transmission light passing through the waste glass cullet is detectable in a form of an image of several pieces of waste glass cullet.

18. The sorting system according to claim 14, wherein the visible transmission light passing through the waste glass cullet is detectable in a form of an image of several pieces of waste glass cullet, and wherein the infrared transmission light passing through the waste glass cullet is detectable in a form of an image of several pieces of waste glass cullet.

* * * * *